United States Patent [19]

Harwood et al.

[11] 4,143,398

[45] Mar. 6, 1979

[54] AUTOMATIC BRIGHTNESS CONTROL CIRCUIT EMPLOYING A CLOSED CONTROL LOOP STABILIZED AGAINST DISRUPTION BY LARGE AMPLITUDE VIDEO SIGNALS

[75] Inventors: Leopold A. Harwood, Bridgewater; Erwin J. Wittmann, North Plainfield, both of N.J.

[73] Assignee: RCA Corporation, New York, N.Y.

[21] Appl. No.: 888,932

[22] Filed: Mar. 22, 1978

[51] Int. Cl.² .................. H04N 5/16; H04N 9/535
[52] U.S. Cl. .............................. 358/34; 358/168; 358/172
[58] Field of Search ............. 358/168, 171, 172, 178, 358/27, 39, 34

[56] References Cited

U.S. PATENT DOCUMENTS

| | | | |
|---|---|---|---|
| 3,588,341 | 6/1971 | Hansen | 358/168 |
| 3,597,540 | 8/1971 | MacIntyre | 358/168 |
| 3,885,093 | 5/1975 | Mooney | 358/172 |
| 3,985,954 | 10/1976 | Kuniyoshi et al. | 358/171 |

*Primary Examiner*—John C. Martin

*Attorney, Agent, or Firm*—Eugene M. Whitacre; William H. Meagher; Ronald H. Kurdyla

[57] ABSTRACT

Brightness control apparatus in a video system employing a sample and hold circuit including a charge storage capacitor. The sample and hold circuit forms a closed control loop with a signal processing channel, and is keyed during periodic blanking intervals of the video signal to sample the magnitude of a reference voltage and a brightness representative blanking level of the video signal. The sample and hold circuit provides an output control signal indicative of the voltage difference between the reference voltage and the blanking level. The control signal is applied to the signal channel for translating the blanking level in a direction to minimize the voltage difference, so that a desired relationship between the reference voltage and the blanking level is preserved. In a preferred embodiment, a diode coupled between a sampling transistor and the capacitor assures that the capacitor is not charged improperly in the event the normal current conducting mode of the transistor is disrupted in the presence of large amplitude video signals, thereby preventing operation of the closed control loop from being disrupted.

15 Claims, 3 Drawing Figures

AUTOMATIC BRIGHTNESS CONTROL CIRCUIT EMPLOYING A CLOSED CONTROL LOOP STABILIZED AGAINST DISRUPTION BY LARGE AMPLITUDE VIDEO SIGNALS

This invention relates to automatic image brightness control apparatus operatively associated with luminance or chrominance signal processing circuits of a color television receiver, and more particularly to such apparatus arranged in a closed control loop and including means for preventing the closed control loop from being disrupted under certain signal conditions.

Image information of a composite video signal such as a television signal is defined by a luminance component in the case of a monochrome signal, and by both the luminance component and a chrominance component in the case of a color signal. In either case, a brightness reference level is contained in a blanking level of the luminance component, which approximates the black level. Viewer control of image brightness typically is accomplished by means of a manually adjustable potentiometer, which serves to provide a reference voltage representative of a desired level of image brightness.

The brightness determining blanking level of a video output signal, which is to be coupled to an image reproducing device, preferably should exhibit a fixed relationship (i.e., track closely) with the reference voltage which corresponds to a desired level of image brightness. However, the blanking level can undesirably vary due to variations of the operating characteristics of circuitry which process the video signal after the blanking level has been established in response to the brightness reference voltage. Such variations can be caused by voltage drift attributable to temperature changes or supply voltage variations, for example.

It is therefore advantageous to automatically compensate for these variations to maintain the blanking level and the brightness reference voltage in a substantially fixed, desired relationship such that deviations from this relationship are minimized. An unstable blanking level can cause perceivable variations of the brightness of a reproduced image, which can be disconcerting to a viewer. Although such variations can be compensated by manually readjusting the brightness reference voltage, manual readjustment can be time consuming and inconvenient, and therefore undesirable.

An automatic brightness control arrangement for achieving these results in a video signal image reproducing system is described in a copending U.S. patent application of A. V. Tuma, et al., Ser. No. 794,128 entitled "Brightness Control Circuit Employing A Closed Control Loop." In this arrangement, a keyed sampling circuit including a charge storage capacitor forms a closed control loop with a video signal processing channel, and is keyed during periodic blanking intervals of the video signal to sample the magnitude of a locally provided reference voltage and a brightness representative blanking level of the video signal which may vary undesirably. The sample and hold circuit provides an output control signal indicative of the voltage difference between the reference voltage and the blanking level. The control signal is applied to the signal channel for translating the blanking level in a direction to minimize the voltage difference, so that a desired relationship between the reference voltage and the blanking level is preserved.

In order to provide the control signal in systems of this type, the storage capacitor is periodically charged and discharged in accordance with the magnitude and relative polarity of the voltage difference between the reference voltage and the blanking level. Under certain signal conditions (e.g., high level video signals as applied to the sampling circuit) it is possible for the storage capacitor to become improperly charged such as with excessive charge, with the result that the control loop is disrupted or disabled and remains so until appropriate, often inconvenient, steps are taken to restore normal system operation. It is desirable to reduce the likelihood of such disruption to an acceptable minimum.

Apparatus in accordance with the present invention includes a video signal transmission channel for processing an image representative video signal. The video signal comprises periodically recurring image intervals, and image blanking intervals disposed between succeeding image intervals and containing a blanking level determinative of image brightness. A source of reference voltage representative of a desired image blanking level is also included. A sampling circuit samples the reference voltage and the blanking level during the blanking interval to develop an output control signal indicative of the difference between the reference voltage and the blanking level. The sampling circuit includes an active current conducting device for normally conducting current in a given direction during sampling intervals, and having an input supplied with the video signal and an output for providing the control signal. A charge storage device is coupled to the output of the active device for storing the control signal during image intervals. An additional circuit is coupled between the active device and the storage device for permitting current conduction of the active device in the given direction with respect to the storage device during the sampling intervals, and for inhibiting current conduction of the active device in an opposite direction with respect to the storage device during the image intervals. The stored signal is applied to the video channel for varying the blanking level in a direction to reduce the difference to a minimum.

In a preferred embodiment of the invention, the additional circuit comprises a diode included in the output circuit of the active device and poled for forward current conduction in the given direction.

In another embodiment of the invention, the additional circuit comprises an electronic switch coupled between the output of the active device and the storage device. The switch is keyed to permit current conduction between the active device and the storage device only during the sampling intervals.

In the drawing, FIG. 1 is a diagram partially in block form and partially in schematic diagram form of a portion of a color television receiver employing apparatus in accordance with the present invention;

Figure 1:
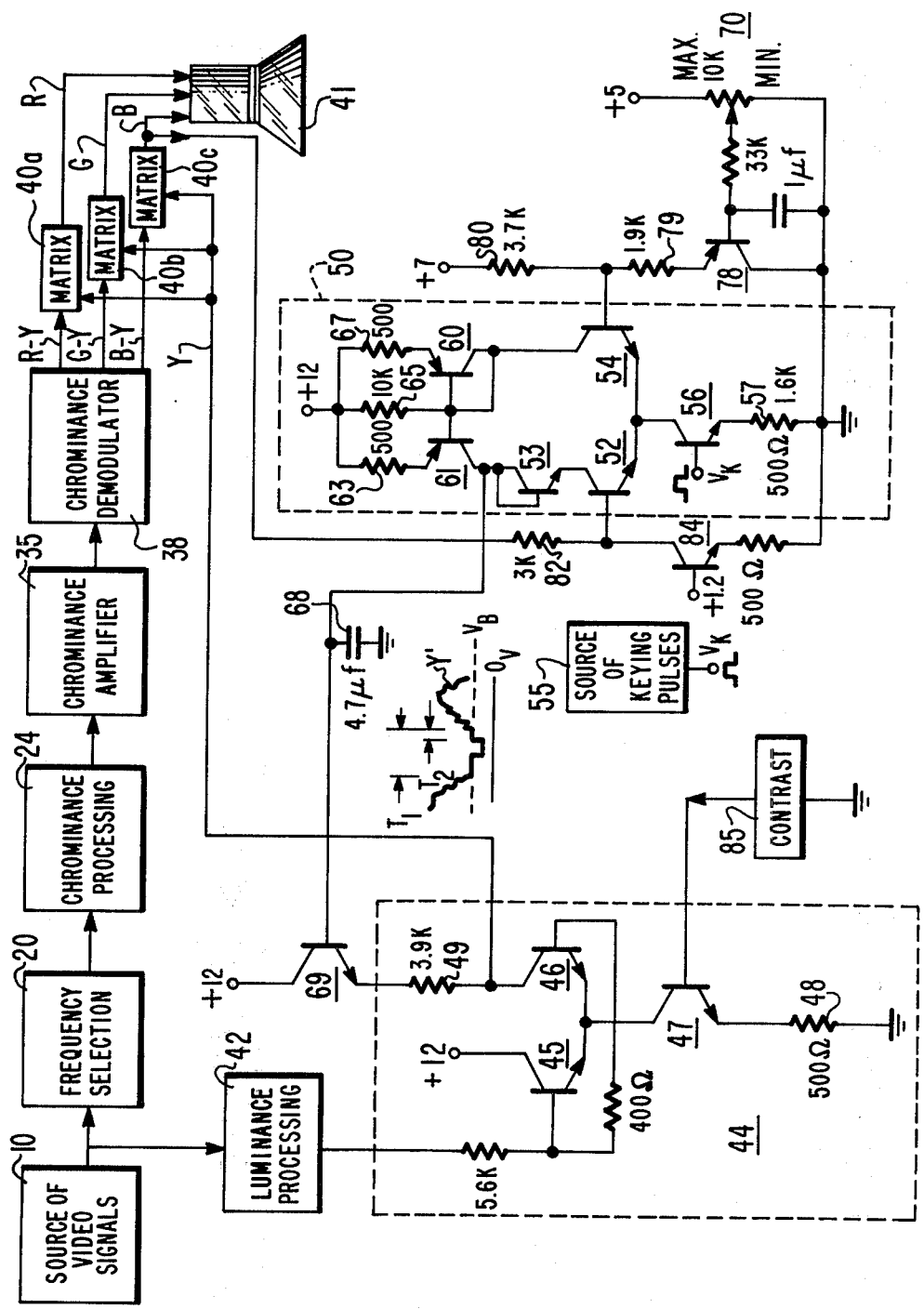

In FIG. 1, a source of video signals 10 provides detected composite video signals comprising luminance and chrominance signal components. The chrominance component is coupled via a frequency selection unit 20 to a chrominance signal processing unit 24 of a chrominance channel of the receiver. Chrominance processing unit 24 may, for example, include a signal amplification stage as well as automatic color control (ACC) and automatic phase control (APC) stages. Processed signals from unit 24 are further amplified by a chrominance amplifier 35 and are supplied to a chrominance demodulator 38 for deriving R-Y, B-Y and G-Y color difference signals. The color difference signals are each combined with a luminance signal Y in matrix networks 40a, 40b and 40c, respectively, to produce R, G and B color representative signals. These signals are then coupled to a kinescope 41 via suitable kinescope driver stages (not shown).

A luminance signal processing unit 42 in a luminance channel of the receiver serves to amplify and otherwise process the luminance component of the composite video signal from source 10. The processed luminance signals are supplied to a luminance amplifier 44 comprising a pair of transistors 45, 46 arranged in differential amplifier configuration, and a current source including a transistor 47 and a resistor 48 for supplying operating currents to transistors 45 and 46. A load circuit for amplifier 44 comprises a common collector bias transistor 69 and a load resistor 49 arranged in a collector circuit of transistor 46. An amplified luminance signal (Y) appears at a collector electrode of transistor 46 and is coupled to each of similar matrix networks 40a, 40b and 40c.

Luminance signal Y contains a periodically recurring horizontal line retrace blanking interval $T_1$ disposed between individual horizontal line image trace intervals containing luminance image information Y'. The blanking interval comprises a negative-going line synchronizing pulse and a blanking level $V_B$ (i.e., a brightness reference level). Blanking level $V_B$ does not vary with image information and approximates a black level of the luminance signal. However, variations of the blanking level produce corresponding variations of the brightness level of a reproduced image.

In the case of a composite color television signal, a portion of a so-called "back porch" time interval ($T_2$) of the composite video signal contains several cycles of a color subcarrier reference signal (i.e., a color burst reference signal) of a frequency of approximately 3.58 MHz according to United States television standards. The burst signal is removed from the luminance signal by a preceding 3.58 MHz trap (not shown), so that interval $T_2$ contains only the brightness reference blanking level.

Adjustment of image contrast is accomplished via a contrast control unit 85 (e.g., a viewer adjustable potentiometer). Contrast control 85 serves to vary the current conduction of current source transistor 47 and thereby the gain of amplifier 44, and consequently the peak-to-peak amplitude of the luminance signal appearing at the collector of transistor 46.

Image brightness is manually adjustable via a network including a source of positive D.C. potential (+5 volts) and an associated brightness control potentiometer 70. Illustratively, increased brightness is provided by adjusting a wiper of potentiometer 70 toward an extreme upper position (MAX). This serves to increase the base bias of a PNP transistor 78 such that the conduction of transistor 78 is reduced. An increased voltage then appearing at an emitter of transistor 78 is D.C. translated to a more positive level via a voltage divider comprising series resistors 79, 80 and a source of potential (+7 volts). A corresponding translated direct voltage appearing at the junction of resistors 79 and 80 is representative of a brightness reference voltage developed in accordance with the position of the wiper of brightness control potentiometer 70, and is coupled to an input of a high gain, keyed differential comparator circuit 50.

In this example, a brightness reference D.C. voltage at the wiper of brightness control potentiometer 70 can be adjusted between zero and five volts. Resistors 79 and 80 together with transistor 78 serve to translate this voltage range to a more positive voltage range of about five to seven volts at the base of transistor 54. This voltage range is selected so as to conform with an expected voltage range of the blanking level (approximately five to seven volts) occurring during time $T_2$, since this level is related to image brightness.

Comparator 50 comprises a pair of emitter coupled sampling transistors 52 and 54 arranged in differential amplifier configuration. Operating currents for transistors 52 and 54 are supplied via a keyed current source transistor 56 and a resistor 57. An active load network for transistors 52, 54 includes a current mirror arrangement comprising a transistor 61, a diode-connected transistor 60, a resistor 65 and current matching resistors 63 and 67, all arranged as shown.

The translated brightness reference voltage from potentiometer 70 is coupled to a base input of sampling transistor 54. A base input of sampling transistor 52 is coupled to the blue (B) signal output of matrix network 40c via a D.C. voltage translating resistor 82, which serves to establish a desired dynamic operating range of comparator 50. The collector current of a transistor 84 flowing in resistor 82 provides a D.C. level shift and a bias reference for transistor 52. A collector output of transistor 52 is coupled to an average responding charge storage capacitor 68 and to a base electrode of transistor 69 via a diode-connected transistor 53. Diode 53 is poled to conduct forward current in the same direction as the collector-emitter current of transistor 52. As will be discussed, diode 53 serves to prevent transistor 52 from improperly charging capacitor 68 in the presence of conditions which disrupt the normal current conducting mode of transistor 52. A signal developed across capacitor 68 serves to control the blanking level of luminance signal Y appearing at the collector of transistor 46 of luminance amplifier 44, as will be discussed.

The blanking level of the luminance signal and hence the brightness of a reproduced image are controlled in response to a voltage appearing at the base electrode of transistor 69. The manner by which this is accomplished is described in detail in the copending U.S. patent application of A. V. Tuma, et al. mentioned earlier.

Comparator 50, luminance amplifier 44 and matrix 40c form a closed control loop (i.e., a servo loop) for maintaining a substantially fixed relationship between the D.C. voltage setting of potentiometer 70 (representing a desired brightness or blanking level of a reproduced image), and the brightness determining blanking level of the signal (B) applied to kinescope 41 from matrix 40c. Comparator 50 and capacitor 68 are arranged as a "sample and hold" network. "Sampling" occurs during the burst interval of time $T_2$, and "holding" occurs during the remainder of each horizontal line cycle.

Current source transistor 56 of comparator 50 and consequently sampling transistors 52 and 54 are keyed "on" (i.e., rendered conductive) during the sampling period in response to positive periodic keying pulses $V_K$ applied to the base of transistor 56 during the burst interval of time $T_2$. The periodic keying pulses are supplied from a source of keying pulses 55, which can be of the type described in U.S. Pat. No. 4,051,518 of G. K. Sendelweck. Since time $T_2$ corresponds to a portion of a blanking or image retrace time during which luminance and chrominance image information are not present in the video signal, the video output signal from matrix 40c coupled to the base of transistor 52 contains only the blanking level component at this time.

Under static brightness control conditions for a given setting of potentiometer 70 and a given time when transistor 56 is keyed "on", comparator 50 compares the voltage then appearing on the base of transistor 54 (corresponding to a desired brightness level in accordance with the setting of potentiometer 70), with the voltage then appearing on the base of transistor 52 (corresponding to the brightness representative blanking level of the signal then appearing at the output of matrix network 40c). If an imbalance exists between these voltages, by differential action comparator 50 generates a control signal at the collector of transistor 52, and hence across capacitor 68 and at the base of transistor 69, of a magnitude and direction to reduce the imbalance toward zero such that the difference between the base voltages of transistors 52 and 54 approaches zero (i.e., zero error). The amount by which this difference can be made to approach zero is a function of the gain of comparator 50. Increasing the gain of comparator 50 increases the capability of reducing this difference, or error, to zero.

A difference in voltage between the base electrodes of comparator transistors 52 and 54 can be due to readjustment of the setting of potentiometer 70, or to a shift of the blanking level of signal B due to temperature changes or otherwise.

Illustratively, the blanking level of signal B can undesirably drift to a more positive level corresponding to increased brightness, or potentiometer 70 can be adjusted toward the MIN position, thereby causing the base voltage of transistor 52 to increase relative to the base voltage of transistor 54. The collector current and collector voltage of transistor 52 then increase and decrease, respectively, relative to the collector current and voltage of transistor 54 by virtue of the differential action of comparator 50 during the keying interval of time $T_2$. The relatively increased collector voltage of transistor 54 is in a direction to bias PNP transistor 61 for reduced current conduction. A charge otherwise appearing across capacitor 68 is depleted (discharged) via the collector-emitter current path of transistor 52 in proportion to the level of conduction of transistor 52. The base voltage of transistor 69 decreases a corresponding amount, causing the blanking level of luminance signal Y at the collector of transistor 46 to also decrease a corresponding amount. The reduction of the blanking level of luminance signal Y is in a direction to reduce the potential difference between the base electrode of comparator transistors 52, 54 toward zero, corresponding to the desired relationship.

Conversely, when the base of transistor 54 is positive relative to the base of transistor 52, the conduction of transistors 54 and 52 respectively increase and decrease during the keying interval. A voltage then appearing at the collector of transistor 54 biases PNP transistor 61 for increased current conduction, and the collector current of transistor 61 serves to charge capacitor 68 and thereby raise the base voltage of transistor 69. The increased base voltage of transistor 69 in turn serves to raise the blanking level of luminance signal Y at the collector of transistor 46 in a direction to reduce the potential difference between the base electrodes of transistors 52 and 54 toward zero.

During the interval when transistor 56 is not keyed "on", comparator 50 is essentially disconnected from capacitor 68, since transistors 52, 54 and 61 are non-conductive during this time. It is noted that comparator 50 is keyed "on" only during the relatively short keying interval (about four microseconds) of time $T_2$. However, it is necessary to hold the charge on capacitor 68 during the image trace interval (approximately sixty microseconds) of each horizontal line scanning period. This is accomplished by employing the current mirror arrangement including PNP transistors 60 and 61 in the collector circuit of transistor 52. Such arrangement presents a very high impedance discharge path for capacitor 68 when comparator 50 is non-conductive during the image interval, and also desirably exhibits substantially no voltage drop or temperature losses when comparator 50 is keyed.

The collector-base junction and base-emitter junction of transistor 52 are normally reverse-biased and forward biased, respectively, so that transistor 52 operates within a linear current conduction region for normally expected range of signal amplitudes as applied to the base electrode of transistor 52. Neglecting diode 53 for the moment and assuming that the collector of transistor 52 is connected directly to capacitor 68, it is possible for the normal current conducting mode of transistor 52 to be reversed when large, positive amplitude signals are present. Specifically, for a given voltage then present on capacitor 68, large amplitude video signals can be sufficient to forward bias the otherwise reverse biased collector-base junction of transistor 52. The collector-base junction of transistor 52 then operates as a forward biased diode (i.e., the collector of transistor 52 behaves as an emitter), whereby the current conduction of transistor 52 with respect to capacitor 68 is reversed. When this occurs, current from the collector of transistor 52 flows improperly in a direction to charge capacitor 68. This condition produces an undesirable regenerative effect which disrupts the operation of the control loop, as discussed below in connection with the circuits of FIG. 1 and FIG. 2.

Figure 2:
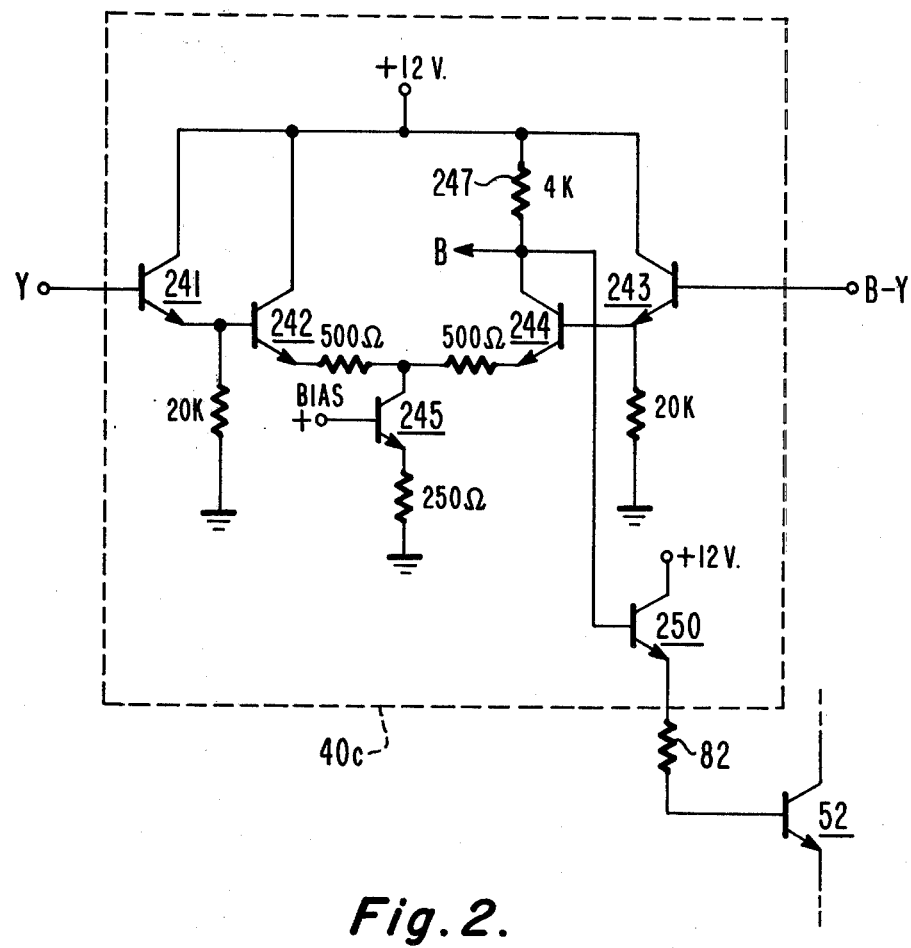
FIG. 2 illustrates a portion of the arrangement of FIG. 1 in circuit form.

FIG. 2 depicts matrix 40c in circuit form. In FIG. 2, the luminance signal (Y) and the B-Y color difference signal are coupled to respective inputs of a differential amplifier including transistors 241-245 arranged as shown. A load resistor 247 is coupled between a collector output of transistor 244 and a positive D.C. operating supply (+12 volts). Signals to be sensed by sampling transistor 52 of comparator 50 are coupled from the collector of transistor 244 to the base input of sampling transistor 52 via a follower transistor 250 and resistor 82.

Excess voltage improperly placed on capacitor 68 when the normal current conducting mode of transistor 52 is reversed serves to raise the average D.C. level (including the blanking level) of luminance signal Y supplied to matrix circuit 40c in a positive or whitegoing direction. The differential action of matrix transistors 242-244 causes the collector voltage of transistor 244 to rise a corresponding amount, which is transmitted to the base of transistor 52 via follower 250. Since the base-to-collector junction of transistor 52 is now operating as a forward biased diode, the increased collector voltage of transistor 244 is transmitted to capacitor 68, to complete the loop. This regenerative process repeats until no additional charge can be placed on capacitor 68 via the current path including the +12 volt operating supply, resistor 247, transistor 250, resistor 82 and the forward biased base-collector junction of transistor 52 (assuming for the moment that diode 53 is absent and the collector of transistor 52 is coupled to capacitor 68). An abnormally high voltage (approaching the level of the +12 volt supply) then quickly appears on capacitor 68 as a consequence of this regenerative action.

It is noted that this condition is most likely to occur during the image trace interval, since normally expected (positive) signal levels are most likely to be exceeded during this time, whereas the blanking level occurs at a significantly less positive level. Thus this condition can occur during the non-sampling interval when comparator 50 is keyed "off". When this condition occurs, the closed control loop becomes "locked up", or disrupted, until such time as capacitor 68 can discharge a sufficient amount to allow the collector-base junction of transistor 52 to revert to the normal reverse bias status. Until this occurs, comparator 50 and the closed control loop are disabled. Also, the abnormally high charge on capacitor 68 causes the average D.C. level of the luminance signal to increase to a level such that displayed image information is replaced by a white raster, since this level corresponds to an extreme white level of the luminance signal. Brightness control 70 is ineffective while this condition persists.

The excess charge on capacitor 68 must be removed in order to remove this undesirable condition and restore normal operation of the closed control loop. This can be accomplished, for example, by the inconvenient and annoying procedure of turning off the receiver to allow capacitor 68 to discharge then re-energize the receiver.

Diode-connected transistor 53 is arranged in the collector circuit of transistor 52 to prevent the situation described above from occurring. Diode 53 is poled to conduct forward current in the same direction as the normal collector current of transistor 52 (that is, in a direction to discharge capacitor 68 via transistor 52). Thus if the collector-base junction of transistor 52 becomes forward biased as mentioned, diode 53 will block the "reverse" base-to-collector current flow from transistor 52 to capacitor 68, thereby preventing the unwanted regenerative loop action from occurring, since the charge on capacitor 68 will not be affected by the "reverse" current from transistor 52.

Figure 3:
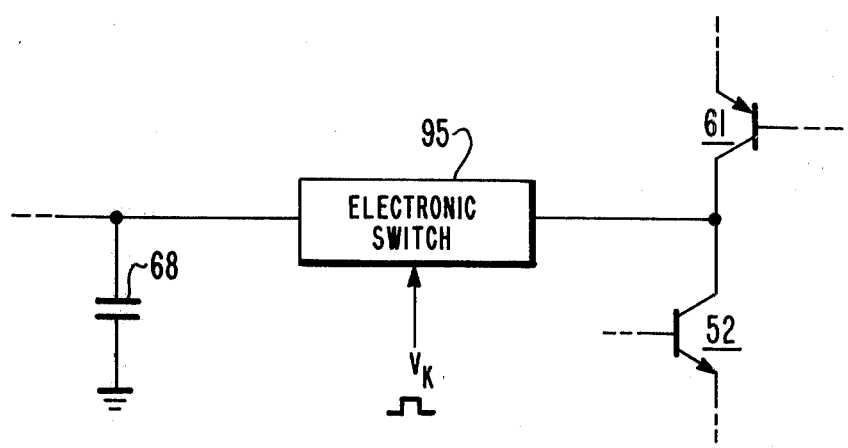
FIG. 3 depicts an alternate arrangement of apparatus according to the present invention.

An alternate arrangement for preventing loop disruption under the circumstances discussed is shown in FIG. 3. In this example, a keyed electronic switch 95 is coupled to the path from the collector output of transistor 52 to charge storage capacitor 68. Switch 95 can be any suitable switching device (e.g., a transistor), including a bilaterally conductive transmission gate disposed between capacitor 68 and the collector of transistor 52.

Switch 95 is controlled in response to keying signals $V_K$ such that the current conduction path between transistor 52 and capacitor 68 is "closed" during each interval $T_2$ to permit normal bidirectional current flow between capacitor 68 and transistors 61 and 52, and "opened" to inhibit current flow in this path during the remaining portion of the video signal. Thus if the collector-base junction of transistor 52 is forward biased by a large amplitude signal during the image interval, the resulting reverse base-to-collector current conduction of transistor 52 will not affect the charge on capacitor 68 since the current path therebetween will then be "open" due to the action of switch 95. Accordingly, switch 95 essentially serves the same purpose as diode 53 (FIG. 1) to prevent improper, excessive charging of capacitor 68 during the image interval.

The described brightness control circuit can also be arranged so that only luminance amplifier 44 and comparator 50 are included in the control loop (i.e., only the luminance signal is sampled), as discussed in the aforementioned copending U.S. patent application of A. V. Tuma, et al. As also discussed therein, comparator 50 can be arranged to sense the outputs of matrix network 40b, or a combination of matrix outputs.

What is claimed is:

1. In a system including a video signal channel for processing an image representative video signal having periodically recurring image intervals, and image blanking intervals disposed between succeeding image intervals and containing a blanking level determinative of image brightness, apparatus comprising:
   means for providing a reference signal representative of a desired image blanking level;
   means for sampling said reference signal and said blanking level during said blanking interval to provide an output control signal indicative of the difference between said reference signal and said blanking level; said sampling means including an active current conducting device for normally conducting current in a given direction during sampling intervals, and having an input supplied with said video signal and an output for providing said control signal;
   means coupled to said output of said active device for storing said control signal during said image interval;
   circuit means coupled between said active device and said storing means for permitting current conduction of said active device in said given direction with respect to said storing means during sampling intervals, and for inhibiting current conduction of said active device in an opposite direction with respect to said storing means during intervening intervals; and
   means for coupling said stored control signal from said storing means to said channel, for varying said blanking level in a direction to reduce said difference to a minimum.

2. Apparatus according to claim 1, wherein:
   said sampling means comprises a keyed comparator; and
   said circuit means comprises a unilateral current conducting semiconductor device coupled to said output of said active device and poled for forward current conduction in said given direction.

3. Apparatus according to claim 2, wherein:
   said unilateral current conducting device comprises a diode-connected transistor.

4. Apparatus according to claim 2, wherein:
   said storing means comprises a capacitor; and
   said circuit means comprises a diode coupled between said capacitor and said output of said active device.

5. Apparatus according to claim 1, wherein:
   said active device comprises a transistor having a base input electrode, a collector output electrode, and an emitter electrode defining a main current conduction path with said collector electrode, the base-emitter and collector-base junction of said transistor being normally forward biased and reverse biased, respectively, to permit operation of said transistor in a linear region.

6. Apparatus according to claim 5, wherein: said circuit means comprises a diode coupled to said collector electrode, said diode being poled for forward current conduction to permit current flow between said storing means and said transistor in said given direction, and to inhibit current flow between said storing means and said transistor in an opposite direction.

7. Apparatus according to claim 1, wherein: said sampling means comprises a first transistor corresponding to said active device and a second transistor arranged in a differential amplifier configuration; and a load network coupled to said first transistor.

8. Apparatus according to claim 7, wherein: said first and second transistors each have base, emitter and collector electrodes and are arranged in emitter coupled differential amplifier configuration, said base electrode of said first transistor being coupled to said channel and said base electrode of said second transistor is coupled to said reference signal, said collector electrodes of said first and second transistors being coupled in common to said load network; said storing means is coupled to said collector of said first transistor; and said circuit means is coupled between said storing means and said collector of said first transistor to permit current flow therebetween in said given direction.

9. Apparatus according to claim 8, wherein: said load network comprises an active load network for supplying current to said storing means in a direction opposite to said given direction.

10. Apparatus according to claim 9, wherein: said active load network comprises a current mirror network; and said circuit means comprises a diode.

11. Apparatus according to claim 1, wherein: said sampling means is coupled to said video channel at a first point for sensing said blanking level; and said control signal is coupled to said video channel at a second point prior to said first point to form a closed loop with said video channel.

12. Apparatus according to claim 1, wherein said system comprises a color television system for processing a color image representative signal, said system including a video signal transmission path having a chrominance channel for processing a chrominance component of said video signal, a luminance channel for processing a luminance component of said video signal, and means for combining signals processed by said luminance and chrominance channels, and wherein: said sampling means is coupled to an output of said combining means at a first point in said signal transmission path for sensing said blanking level; and said control signal is coupled to said luminance channel at a second point in said transmission path prior to said first point to form a closed loop with said signal transmission path.

13. Apparatus according to claim 1, wherein: said circuit means comprises a keyed electronic switch coupled between said output of said active device and said storing means and keyed to permit current conduction between said active device and said storing device only during said sampling interval.

14. In a system including a video signal channel for processing an image representative video signal having periodically recurring image intervals, and image blanking intervals disposed between succeeding image intervals and containing a blanking level determinative of image brightness, apparatus comprising: means for providing a reference signal representative of a desired image blanking level; means for sampling said reference signal and said blanking level during said blanking interval to provide an output control signal indicative of the difference between said reference signal and said blanking level; means coupled to said sampling means via a conductive path, for storing said control signal during said image interval; electronic switch means coupled to said conductive path for interrupting said conductive path during said image intervals and for enabling said conductive path during said blanking intervals; and means for coupling said stored control signal from said storing means to said channel, for varying said blanking level in a direction to reduce said difference to a minimum.

15. Apparatus according to claim 14, wherein: said switch means comprises a keyed transmission gate coupled between said sampling means and said storing means.

* * * * *